United States Patent
Sherritt

(10) Patent No.: US 9,327,410 B1
(45) Date of Patent: May 3, 2016

(54) METHOD OF OPERATING A STEPPER MOTOR ESPECIALLY ADAPTED FOR USE WITH A DATA STORAGE LIBRARY PICKER ASSEMBLY

(71) Applicant: Spectra Logic Corporation, Boulder, CO (US)

(72) Inventor: Jay Gregory Sherritt, Boulder, CO (US)

(73) Assignee: Spectra Logic, Corporation, Boulder, CO (US)

( * ) Notice: Subject to any disclaimer, the term of this patent is extended or adjusted under 35 U.S.C. 154(b) by 35 days.

(21) Appl. No.: 14/515,364

(22) Filed: Oct. 15, 2014

(51) Int. Cl.
- *B25J 15/02* (2006.01)
- *B65G 1/06* (2006.01)
- *B25J 15/00* (2006.01)
- *H02P 8/14* (2006.01)

(52) U.S. Cl.
CPC .......... *B25J 15/0253* (2013.01); *B25J 15/0028* (2013.01); *B65G 1/06* (2013.01); *H02P 8/14* (2013.01)

(58) Field of Classification Search
CPC ..... B25J 15/0253; B25J 15/0028; H02P 8/14; B65G 1/06; G11B 15/605
See application file for complete search history.

(56) References Cited

U.S. PATENT DOCUMENTS

| | | | | |
|---|---|---|---|---|
| 5,091,743 A | * | 2/1992 | Nagata | G03B 27/32 355/27 |
| 2005/0057843 A1 | * | 3/2005 | Egan | G11B 15/43 360/71 |
| 2005/0078299 A1 | * | 4/2005 | Fritz | G01B 11/272 356/39 |
| 2005/0134850 A1 | * | 6/2005 | Rezachek | G01B 11/272 356/399 |
| 2008/0278848 A1 | * | 11/2008 | Asai | G11B 5/54 360/93 |
| 2013/0346687 A1 | * | 12/2013 | Ries | G06F 3/0607 711/112 |
| 2014/0362465 A1 | * | 12/2014 | Anderson | G11B 15/60 360/83 |

* cited by examiner

*Primary Examiner* — James Trammell
*Assistant Examiner* — James E Stroud
(74) *Attorney, Agent, or Firm* — Kenneth Altshuler

(57) ABSTRACT

A method of operation of a stepper motor, especially as used in connection with a picker assembly employed in a data storage library and a picker assembly that may utilize the stepper motor.

18 Claims, 4 Drawing Sheets

METHOD OF OPERATING A STEPPER MOTOR ESPECIALLY ADAPTED FOR USE WITH A DATA STORAGE LIBRARY PICKER ASSEMBLY

FIELD OF THE INVENTION

The present invention relates to the operation of stepper motors, especially as used in the operation of pickers employed in data storage libraries.

BACKGROUND OF THE INVENTION

Data storage libraries conventionally include a controller subject to the command of a host computer, a plurality of media elements, such as optical discs and magnetic tape cartridges, an array of slots for storing the media elements, a drive for performing read/write operations on the media elements, and a robotic transport for transporting the media elements between the slots and the drive. The library controller regulates the storage of the media elements, the transport of the media elements between the slots and the drive, and the read/write operations.

The robotic transport typically includes a so-called picker device or assembly designed to grasp the media element in a slot, transport the media element to the drive, insert the media element into a drive, and release and deposit the media element in the drive, as well as to perform a reverse process by which it grasps the media element within the drive, transports the media element to a slot, inserts the media element in the slot, and releases and deposits the media element in the slot.

The picker assemblies typically include a pair of arms or jaws moveable toward each other for the purpose of gripping, clasping, or clamping the media element and away from each other for the purpose releasing the media element. Typically both arms move under motor actuation and control.

Knowing the width of the media elements used within a data storage library, the motor actuating the movement of the picker arms may be controlled so as to move the arms to an open position to receive the media element and then to close the picker arms to a specified distance apart essentially equal to the width of the media element. Typically, a polyurethane pad or another type of resilient member is placed on the inwardly facing side of each arm and is adapted to abut the lateral sides of the media element to help absorb and distribute the compressive force of the arms with the media element clasped between the arms. Further, the resilient member may be provided with a non-slip or relatively frictional surface that is adapted to help maintain the media element in a compressively clamped condition between the arms. The resilient members on each arm may initially contact the media element, and then the arms are further squeezed together to provide a clamping force, thereby ensuring that the element will be maintained in a position between the jaws as the media element is moved and transported within the data storage library. Such an operation of squeezing the arms through the resilient members will create an initial resistive force and then an increase in resistive force until a predetermined gripping, clasping, or clamping force is attained.

The speed of operation of a data storage library is an important quality, and therefore increasing the speed of operation of a data storage library is a desirable objective. Thus, it is desirable to increase the speed of operation of the picker assembly in grasping and releasing media elements. The type of motor for actuation of the arms should act quickly and with precision. One such motor is a stepper motor. Some of the advantages of a stepper motor are that it is relatively inexpensive, it is capable of precise positioning and repeatability of movement, it possesses an excellent response to starting/stopping/reversing commands, it is very reliable and possesses a relatively long life, and it has a wide range of rotational speeds that can be realized. However, stepper motors also have potentially severe drawbacks. For example, stepper motors have a natural frequency of operation, a so-called self-resonant frequency. If the excitation frequency matches the self-resonant frequency, then a condition of ringing or vibration can become severe and can cause the motor to lose torque. Also, if the stepper motor experiences an increased load, the torque of the motor may slip, resulting in a loss of synchronization and even a reversal of rotation. These undesirable conditions can severely affect the operation of the stepper motor and can require a re-calibration of the stepper motor. The occurrence of these disadvantageous conditions of a stepper motor when operating a picker can shut down the operation of the data storage library.

The present invention reduces the possibility that such undesirable conditions will occur. A stepper motor as used to move picker arms may encounter unexpected loads. For example, sometimes the media elements are deposited in the slots in an angled or skewed orientation such that, when the arms move inwardly to clasp the media element the arms encounter a resistive force when the arms first contact the media element. The arms will experience a continued, usually increasing, resistive force as the arms continue to move together until the media element is operably oriented within and clasped between the arms. If a stepper motor is used to move the arms inward and the resistive force is encountered, the stepper motor will experience a sudden load which may cause slippage, especially if the stepper motor is being operated at a relatively high speed.

The present invention was developed in an attempt to utilize the advantages of a stepper motor, including its high speed operation, while at the same time reducing or eliminating any slippage due to the resistive force as the arms clamp the media element.

SUMMARY OF THE INVENTION

The present invention relates to the operation of a stepper motor, especially as used in connection with a picker assembly employed in a data storage library and a picker assembly that may utilize the stepper motor.

BRIEF DESCRIPTION OF THE DRAWINGS

The invention will be described with reference to the accompanying drawings, wherein.

DESCRIPTION OF PREFERRED EMBODIMENTS

Figure 1:
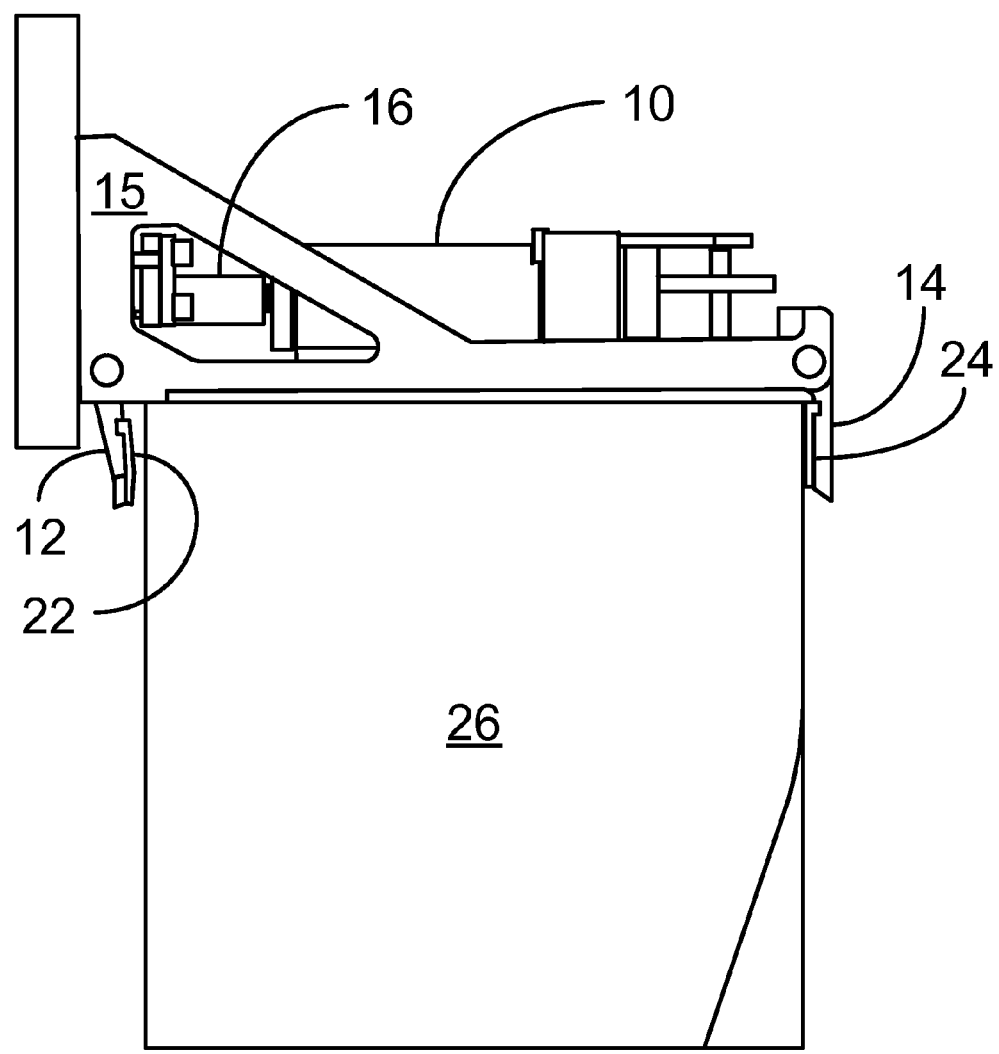
FIG. 1 is a front elevation schematic illustration of a picker assembly in which a magnetic tape cartridge is disposed between the arms of the picker assembly in accordance with one embodiment of the present invention.
Figure 2:
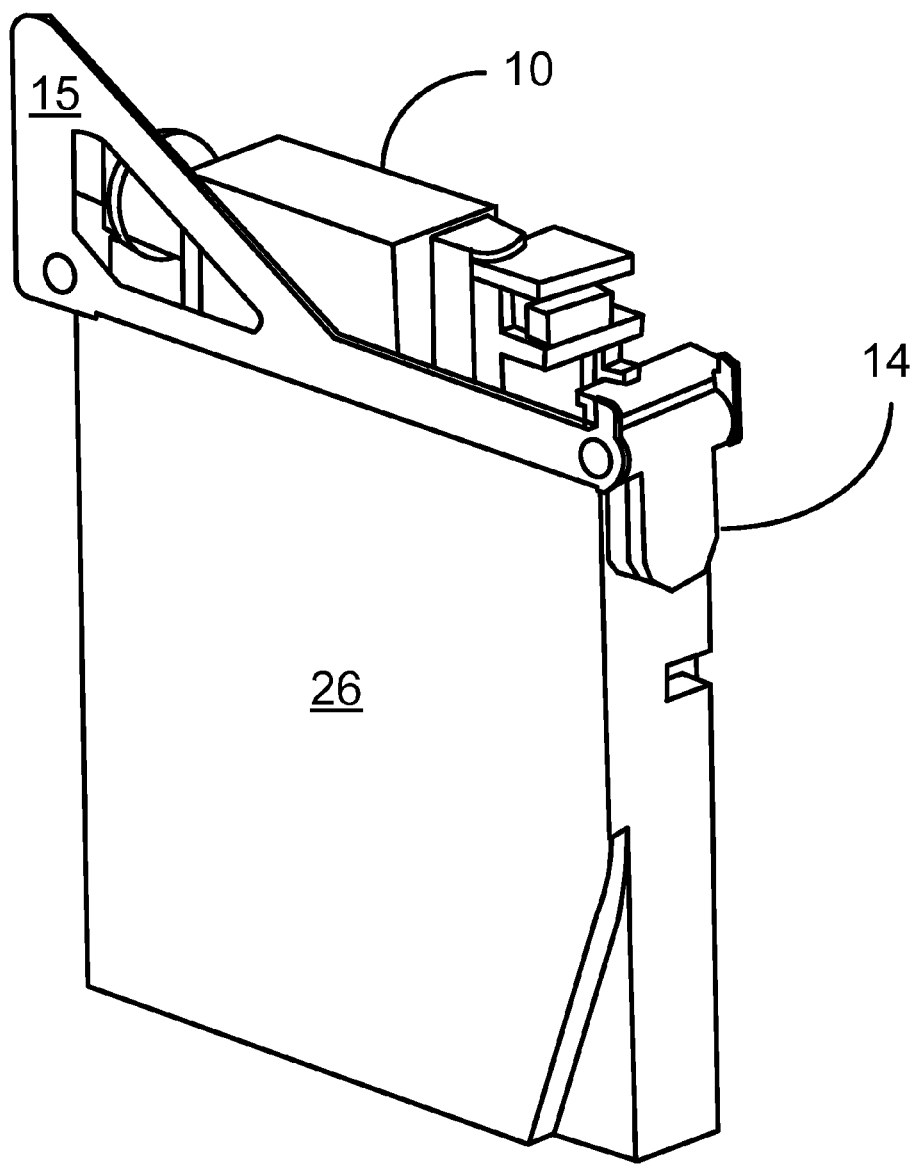
FIG. 2 is a perspective schematic illustration of the picker assembly and magnetic tape cartridge element shown in FIG. 1.
Figure 3:
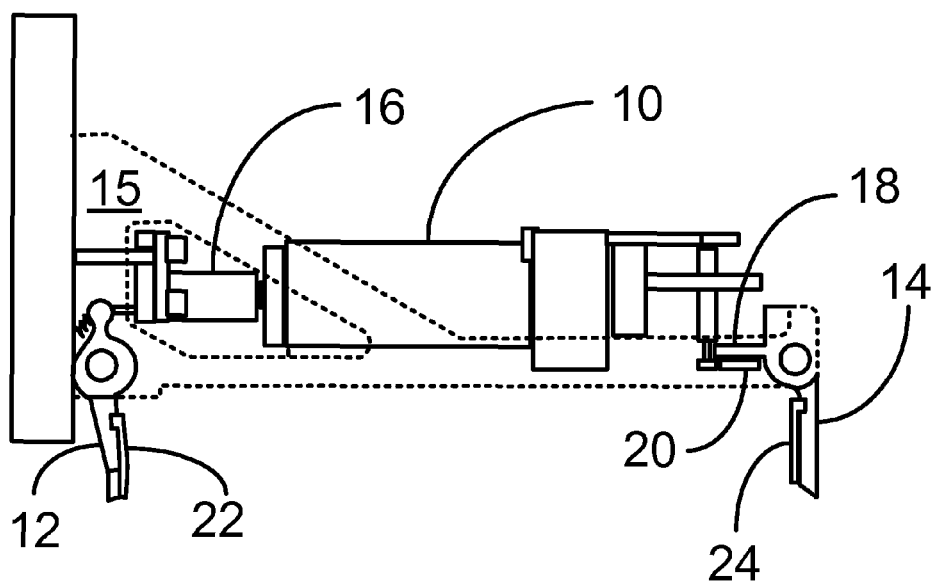
FIG. 3 is a front elevation view of the schematic illustration of a portion of the picker assembly shown in FIG. 1.

The present invention will be described with reference to the accompanying drawings wherein like reference numerals refer to the same item. As shown in FIGS. 1-3, a picker assembly includes a stepper motor 10 which acts on one of the gripper arms 12, with the other gripper arm 14 being idle. As best shown in FIG. 3, the arm 12 under motor control is pivotably mounted to the body of a carriage 15 and is responsive to the longitudinal movement of an actuator 16 of the stepper motor 10. The actuator 16 applies either a pushing or a pulling force on the upper end of the arm 12, which in turn causes the lower end of the arm 12 to pivot inwardly or outwardly, respectively.

The other, idle arm 14 is also pivotably mounted on the carriage 15, but is not under motor control or actuation. The upper end of the arm 14 possesses a lever or shoulder 18 that pivots with the arm 14 and that rests above or lightly on a force gauge or sensor 20 when the arm 14 is pivotably rotated in an inward directional position (clockwise as shown in FIG. 3) and that presses forcefully down on and against the force sensor 20 when the arm 14 is pivoted in an outward directional position (counterclockwise as shown in FIG. 3). The contact of the shoulder 18 against the force sensor 20 thereby provides a stop that prevents further pivoting movement in an outward directional position. Ideally such stopping contact occurs when the arm 14 is essentially perpendicular to the lower surface of the carriage 15 as shown in FIG. 3. There is also preferably another stop (not shown) which limits the inward movement of the arm 14 (in a clockwise direction as shown in FIG. 3) so that the arm 14 is always maintained in a position that may accept a media element between the two arms 12, 14. The inward surfaces of one or both arms 12, 14 may possess an associated polyethylene pad or other resilient member 22, 24 adapted to abut against the associated lateral side surface of the magnetic tape cartridge 26. The surfaces of each resilient members 22 may further possess a non-slip or relatively frictional surface.

As the stepper motor 14 operates to cause the arm 12 to pivot and rotate inwardly (counterclockwise as shown in FIG. 3), the resilient member 22 on the inward surface of the arm 12 will initially contact the associated lateral surface of the magnetic tape cartridge, and further pivoting in that direction will cause the magnetic tape cartridge to be compressively squeezed between the arms 12, 14 and their corresponding resilient members 22, 24. Yet further pivoting of the arm 12 in that direction will increase the compressive force and will cause the arm 14 to pivot outwardly, (in a clockwise direction as shown in FIG. 3), which in turn causes the shoulder 18 on the upper end of the arm 14 to apply an increasing force to the force sensor 20.

A controller associated with the stepper motor 10 causes the motor to stop when the force attains a preselected or predetermined magnitude, such as three and one half pounds. In a preferred embodiment, the force sensor 20 may comprise a piezoelectric crystal in which the resistivity of the crystal changes in proportion to the force applied thereon in a well-known process. An electric current passing through the piezoelectric crystal will be modified by the change of resistivity of the crystal due to the force being applied thereon by the shoulder 18 on the upper portion of the crystal. As such, the change in current may comprise a signal to stepper motor controller as indicative of the force being applied by the arms 12, 14 against the lateral sides of the magnetic tape cartridge 26.

As previously mentioned, the contact of the resilient member 22 on the arm 12 with the magnetic tape cartridge 26 creates a resistance or load against the operation of the stepper motor 10. Further pivotable movement of the arm 12 creates an increasing resistive force and an increasing load until the force attains predetermined magnitude when the stepper motor controller will cause the stepper motor 10 to stop.

In one preferred embodiment of the present invention, the arms 12, 14 of the picker assembly are relatively open so as to accommodate a magnetic tape cartridge 26 therebetween. The stepper motor 10 is then operated at a relatively high speed until a first force threshold is attained, such as when the resilient member 22 of the arm 12 initially contacts a lateral side of the magnetic tape cartridge 26. The stepper motor controller will then immediately drop the speed of the stepper motor 10 to a much slower rate until the force attains a second threshold, such as when the magnetic tape cartridge is initially squeezed between the resilient members 22 of each of the arms 12, 14. When that second threshold of force is attained, the stepper motor controller then reduces the speed of the stepper motor 10 yet again, until the predetermined desired force, such as three and a half pounds, is attained, when the stepper motor controller will cause the stepper motor 10 to stop. Upon the attainment of that condition of predetermined force, the picker assembly may move the magnetic tape cartridge 26 from the slot or from the drive, transport the magnetic tape cartridge, and deposit the magnetic tape cartridge 26 in either the drive or a slot. When the magnetic tape cartridge 26 is appropriately positioned within the drive or a slot, then the data storage library controller will instruct the stepper motor 10 to be actuated so as to move the arm 12 in an outward direction (clockwise as shown in FIG. 3) whereby the magnetic tape cartridge 26 is no longer clamped between the arms 12, 14, and then the picker assembly is moved and withdrawn away from the magnetic tape cartridge 26.

In connection with initiating the stepper motor 10 to cause the arm 12 to move inwardly or outwardly, the stepper motor controller may cause the stepper motor 10 to move at a relatively very low speed to help establish a detent position and one of two rotational directions, in a conventional mode of operation of a stepper motor.

As the robotic transport moves within the data storage library, the picker assembly and the magnetic tape cartridge 26 clamped therein may become jostled, and the clamping force of the arms 12, 14 against the lateral sides of the magnetic tape cartridge 26 may change from the predetermined desired force of three and one half pounds, for example. The stepper motor controller may be configured so as to initiate operation of the stepper motor 10 in one direction or the other whereby the arm 12 moves in appropriate direction to reestablish the predetermined desired force of three and one half pounds. In another embodiment, the stepper motor controller may be configured to monitor whether the force has deviated more than either x amount of force or by y percent of force from the predetermined desired force, and only if that variance has been exceeded, initiate the stepper motor 10 to operate to move the arm 12 either inwardly or outwardly in order to reestablish the predetermined desired force. Again, it should be appreciated that the use in the foregoing example of a predetermined desired force of three and one half pounds is exemplary only, and that such force may be selected among a wide range of forces.

Figure 4:
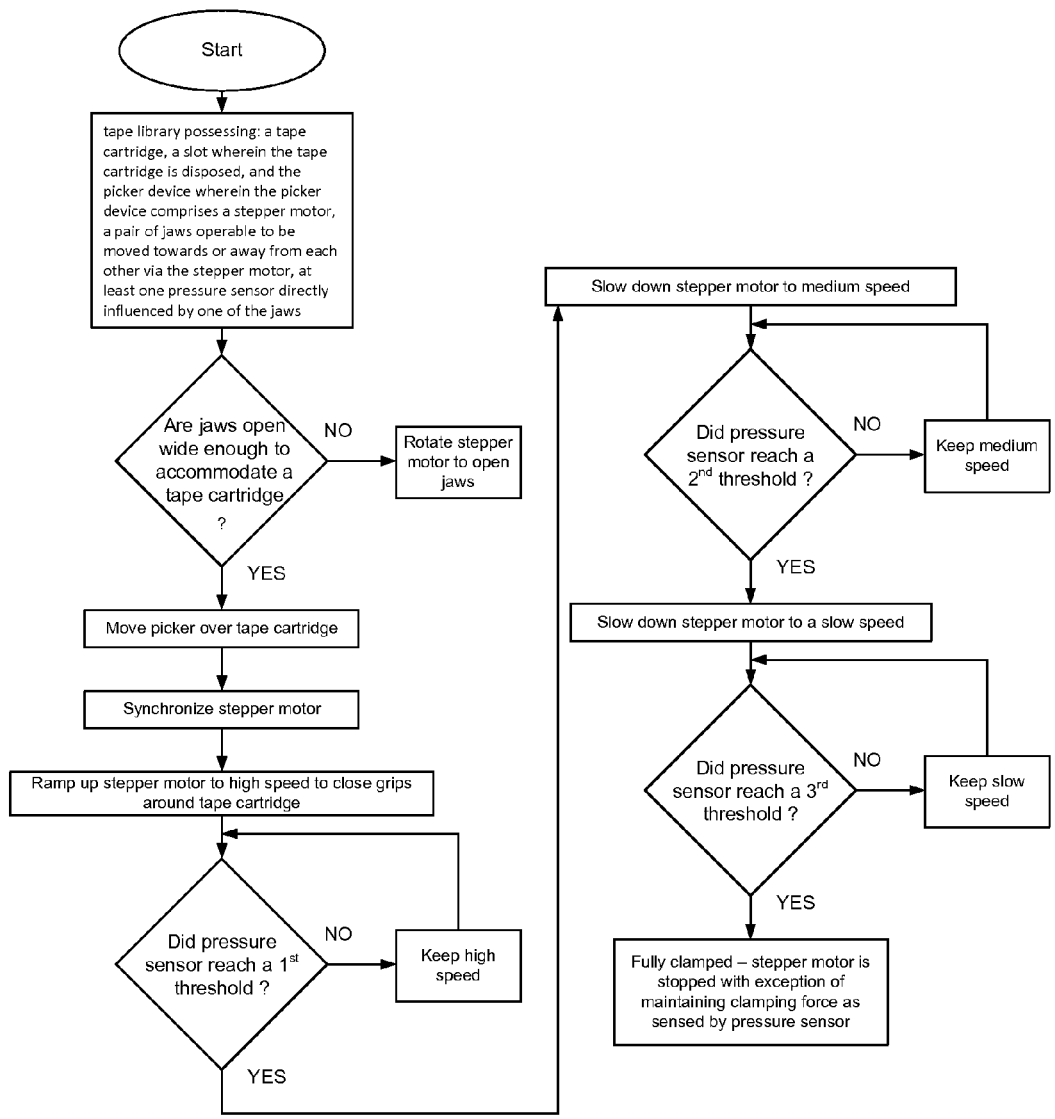
FIG. 4 is a flow diagram of the operation of a stepper motor in the context of a picker assembly in a data storage library in accordance with an embodiment of the present invention.

Although in the foregoing embodiment, there are two force thresholds employed, it should be appreciated that any number of force thresholds may be utilized in accordance with the present invention. FIG. 4 depicts a flow diagram in a preferred method of operation of a stepper motor used to operate the arms of a picker assembly.

It is preferred that the high speed operation of the stepper motor 10 be at many multiples of the self-resonant frequency of the stepper motor, such as more than three times the self-resonant frequency, or more than ten times the self resonant frequency. Also, it is preferred that the medium speed and the slow or low speeds of the stepper motor be significantly less than the self-resonant frequency of the stepper motor, for example, less than half the self-resonant frequency, or less than ten percent of the self-resonant frequency.

The invention contemplates that the force sensor 20, instead of being located adjacent to a shoulder on the upper portion of the arm 14, may be disposed on the inward face of the arm 14, and may, for example, be disposed within, or as part of the resilient member 22 on the arm 14. The term force sensor as used in this specification includes pressure sensors, which sense force per unit area.

The invention also contemplates that instead of a force sensor, the picker assembly may utilize a sensor that detects the amount or degree of separation of one or both of the arms 12, 14 from the associated lateral edge of the media element. Such sensors may include an optical sensor that determines the distance of separation of one or both of the arms 12, 14 and the associated lateral side of the media element or may include one or more contact switches which determine whether one or both of the arms have made contact with the associated lateral side of the media element. The invention contemplates that the optical sensor may provide a signal to the stepper motor controller when the arm 12 is moving towards the associated lateral side of the media element and when the distance of the arm 12 from the lateral side is, for example, a centimeter, which will in turn cause the stepper motor controller to reduce the speed of the stepper motor 10 to a medium speed, and provide another signal to the stepper motor controller when the distance is, for example, three millimeters, which will cause the controller to reduce the speed of the stepper motor further, to a low speed. The contact sensor may be utilized for one or both of the arms 12, 14. When the contact sensor senses contact between the arm 12 and the associated lateral side of the media element, then the contact sensor will send a signal to the stepper motor controller which in turn will cause the stepper motor to reduce its speed to a slow speed.

The invention contemplates that the changes of speed of the stepper motor preferably occur essentially instantaneously. However, the invention also contemplates that the speed change may be linear over a relatively short time, or may be non-linear over a relatively short time.

While exemplary embodiments have been presented in the foregoing description of the invention, it should be appreciated that a vast number of variations within the scope of the invention may exist. The foregoing examples are not intended to limit the nature or the scope of the invention in any way. Rather, the foregoing detailed description provides those skilled in the art with a foundation for implementing other exemplary embodiments of the invention.

I claim:

1. A method applied to a picker device confined to a tape library, the method comprising:
   providing a tape cartridge, a slot wherein the tape cartridge is adapted to be disposed, and the picker device, wherein the picker device comprises a stepper motor, a pair of jaws operable to be moved towards or away from each other via the stepper motor, and at least one pressure sensor directly influenced by at least one of the jaws;
   a) opening the jaws to a separation greater than the width of the tape cartridge;
   b) moving the picker device in a position where the jaws are capable of clamping the tape cartridge;
   c) energizing the stepper motor at a first slow speed to establish a detent position and a rotational direction of the stepper motor;
   d) ramping up the stepper motor to a first high speed in the rotational direction thereby causing the jaws to close;
   e) sensing a first pressure at a first pressure threshold via the pressure sensor when at least one of the jaws contacts the tape cartridge;
   f) ramping down the stepper motor in the rotational direction to a first medium speed in response to sensing the first pressure attaining the first pressure threshold;
   g) sensing a second pressure at a second pressure threshold via the pressure sensor;
   h) slowing the stepper motor to a second slow speed in the rotational direction in response to sensing the second pressure attaining the second pressure threshold;
   i) sensing a third pressure at a third pressure threshold via the pressure sensor wherein the jaws fully clamp on the tape cartridge;
   j) stopping the stepper motor in response to sensing the third pressure attaining the third pressure threshold; and
   k) if the pressure sensed by the pressure sensor varies from the third pressure threshold, rotating the stepper motor in the rotational direction or an opposite rotational direction to maintain the third pressure to hold the fully clamped jaws on the tape cartridge.

2. The method of claim 1 further comprising, after step k):
   l) disposing the tape cartridge in a target location;
   m) after step l), energizing the stepper motor at a third slow speed in the opposite rotational direction of the stepper motor to establish a detent position;
   n) after step m), energizing the stepper motor to rotate at a second medium speed in an opposite rotational direction until the pressure sensor senses a fourth pressure at a fourth pressure threshold thereby causing the jaws to open;
   o) after step n), ramping up the stepper motor to a second high speed in the opposite rotational direction thereby causing the jaws to open further.

3. The method of claim 1 wherein step c) is accomplished within one and three rotations of the stepper motor.

4. The method of claim 1 wherein said first high speed is at least three times the self-resonant frequency of the stepper motor and said first medium speed is less than half of said self-resonant frequency.

5. A method of operating a stepper motor acting on an object that is moveable in response to the rotation of the shaft of the stepper motor comprising:
   a) ramping up the rotational speed of the shaft of the stepper motor to a first speed faster than the self-resonant frequency of the stepper motor;
   b) monitoring a variable value indicative of the amount of the load experienced by the rotating shaft;
   c) setting a first amount of the variable value as a first threshold condition; and
   d) when the monitored variable value attains the first threshold condition, then immediately lowering the rotational speed of the shaft to a second speed slower than the self-resonant frequency of the stepper motor.

6. The method of claim 5 wherein the first speed is more than three times the self-resonant frequency.

7. The method of claim 6 wherein the first speed is more than ten times the self-resonant frequency.

8. The method of claim 5 wherein the second speed is less than half the self-resonant frequency.

9. The method of claim 8 wherein the second speed is less than ten percent of the self-resonant frequency.

10. The method of claim 5 further comprising:
e) setting a second amount of the variable value as a second threshold condition; and
f) when the monitored variable value attains the second threshold condition, then immediately stopping the rotational speed of the shaft.

11. A picker assembly adapted to selectively grasp a media element in a data storage library, said assembly including:
a pair of opposing, spaced, cooperating jaws, at least one of said jaws being moveable toward or away from the other jaw, such that when said at least one moveable jaw moves away from the other jaw, the media element may be disposed therebetween, and such that, when said at least moveable one jaw moves toward the other jaw, the media element may be compressively grasped between and by said jaws;
a stepper motor possessing a controller and a rotatable shaft, said shaft operably acting on said at least one moveable jaw to move said at least one moveable jaw toward or away from the other jaw; and
a force sensor adapted to sense the amount of force of the media element acting against one of said jaws and adapted to send a signal indicative of the amount of said force to said stepper motor controller, wherein said stepper motor controller is configured to receive said signal and to change the rotational speed of said stepper motor in response to said signal.

12. The picker assembly according to claim 11 wherein each of said jaws is pivotably moveable toward or away from the other jaw and wherein said shaft operably acts on only one of said jaws.

13. The picker assembly according to claim 12 wherein a portion of the jaw upon which said shaft does not act is adapted to forcefully contact said force sensor.

14. The picker assembly according to claim 13 wherein said portion is adapted to forcefully contact said force sensor in proportion to the amount of the force of the media element acting against the jaw upon which said shaft does not operably act.

15. The picker assembly according to claim 14 wherein each of said jaws possesses a resilient member disposed thereon in a position facing the other jaw and adapted to compressively abut the media element.

16. The picker assembly according to claim 11 wherein said force sensor includes a piezoelectric element in which electrical resistivity changes in response to the amount of force acting thereon.

17. The picker assembly according to claim 11 wherein said force sensor is mounted on one of said jaws in a position facing the other jaw and is adapted to abut the media element.

18. The picker assembly according to claim 11 wherein said stepper motor controller is configured to run said stepper motor at a speed at least three times the self-resonant frequency until said force sensor senses that the amount of force acting against one of said jaws has attained a predetermined amount of force and then immediately to run said stepper motor at a speed less than one half the self-resonant frequency.

* * * * *